(12) United States Patent
Potter et al.

(10) Patent No.: US 11,870,234 B2
(45) Date of Patent: Jan. 9, 2024

(54) APPARATUS AND METHOD FOR DETECTING SERIES ARCING IN AN ELECTRICAL CIRCUIT

(71) Applicant: Astronics Advanced Electronic Systems Corp., Kirkland, WA (US)

(72) Inventors: Fred J. Potter, Trumbauersville, PA (US); Patrick Mills, Bradenton, FL (US); Warren J. Wambsganss, Snoqualmie, WA (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 17/467,195

(22) Filed: Sep. 4, 2021

(65) Prior Publication Data

US 2022/0077671 A1 Mar. 10, 2022

Related U.S. Application Data

(60) Provisional application No. 63/075,178, filed on Sep. 6, 2020.

(51) Int. Cl.
*H02H 3/20* (2006.01)
*H02H 1/00* (2006.01)

(52) U.S. Cl.
CPC ............ *H02H 1/0015* (2013.01); *H02H 3/20* (2013.01)

(58) Field of Classification Search
CPC .......... H02H 1/0015; H02H 3/20; H02H 3/04; H02H 3/087; H02H 3/28; H02H 3/44; G01R 31/08
USPC ...................................... 361/42–50
See application file for complete search history.

(56) References Cited

U.S. PATENT DOCUMENTS

| 6,121,886 | A | 9/2000 | Anderson | |
|---|---|---|---|---|
| 7,746,605 | B2 | 6/2010 | Elms et al. | |
| 7,872,839 | B2 | 1/2011 | Potter et al. | |
| 8,395,391 | B2 | 3/2013 | Potter et al. | |
| 8,553,373 | B2 | 10/2013 | Rozman et al. | |
| 8,933,746 | B1 | 1/2015 | Potter et al. | |
| 10,134,551 | B2 | 11/2018 | Potter et al. | |
| 10,186,857 | B2 | 1/2019 | Potter et al. | |
| 2004/0027749 | A1* | 2/2004 | Zuercher | H02H 1/0015 361/62 |
| 2004/0150410 | A1 | 8/2004 | Schoepf et al. | |
| 2004/0263183 | A1 | 12/2004 | Naidu et al. | |
| 2005/0017731 | A1* | 1/2005 | Zuercher | H02H 1/0015 324/536 |
| 2005/0254187 | A1 | 11/2005 | Chu | |

(Continued)

OTHER PUBLICATIONS

Patent Cooperation Treaty, PCT/US2021/049172, Written Opinion of the International Searching Authority, Dec. 9, 2021.

*Primary Examiner* — Danny Nguyen
(74) *Attorney, Agent, or Firm* — Wiggin and Dana LLP

(57) ABSTRACT

Series arcing in wiring is a potentially catastrophic situation that has proven to be difficult to detect reliably with existing methods. This invention allows for the quick and accurate detection of series arcing in an electrical circuit. The method works with AC or DC power sources, and at any voltage or current level. This method will also detect high resistance in a circuit, which is another indicator of a potentially hazardous fault condition. The method compares the voltage at each end of a conductor, and will declare a fault when this voltage exceeds the minimum voltage required to sustain arcing.

9 Claims, 4 Drawing Sheets

(56) References Cited

U.S. PATENT DOCUMENTS

| | | | |
|---|---|---|---|
| 2008/0100305 A1* | 5/2008 | Gass | G01R 31/3272 |
| | | | 324/536 |
| 2010/0309591 A1* | 12/2010 | Shea | G01R 19/0092 |
| | | | 361/42 |
| 2011/0214599 A1 | 9/2011 | Pitio et al. | |
| 2012/0275071 A1 | 11/2012 | Gutierrez et al. | |
| 2015/0295395 A1* | 10/2015 | Wortberg | H02H 3/093 |
| | | | 361/86 |
| 2018/0375505 A1* | 12/2018 | Handy | H02J 1/14 |
| 2019/0011492 A1* | 1/2019 | Handy | G01R 31/008 |
| 2020/0028349 A1* | 1/2020 | Elliott | G01R 15/16 |

\* cited by examiner

APPARATUS AND METHOD FOR DETECTING SERIES ARCING IN AN ELECTRICAL CIRCUIT

CROSS-REFERENCE TO RELATED APPLICATION

This application claims the benefit under 35 U.S.C. § 119(e) of U.S. Provisional Application No. 63/075,178 filed Sep. 6, 2020, which is herein incorporated by reference in its entirety.

FIELD OF THE DISCLOSURE

This disclosure relates to an apparatus and a method for detecting series arcing in an electrical circuit. The disclosure relates more particularly to an apparatus and a method for series arc detection that senses and compares the voltage at each end of a conductor and declares a fault when the sensed voltage differential exceeds the minimum voltage required to sustain arcing.

BACKGROUND OF THE DISCLOSURE

Arcing is a serious and potentially hazardous phenomenon that occurs in electrical wiring when a path or gap of sufficiently low resistance presents itself between exposed conductors at different voltage potentials, causing electrical energy to jump, or arc, across that path or gap. Arcing may degrade or damage electric circuitry, generate radio frequency noise, and ignite flammable materials nearby. The danger of arcing is especially acute on aging aircraft where wire insulation may have deteriorated or where vibrations may have caused terminal connections to loosen over time. The bundling of wires due to spacing constraints further exacerbates the dangers of arcing on an aircraft.

Electrical arcing may occur as either parallel arcing or series arcing. Parallel arcing occurs as a result of a short circuit or ground fault. A parallel arc is in parallel with the circuit load and therefore electrical current will bypass the load when parallel arcing occurs. On the other hand, a series arc is, by definition, an arc in series with the circuit load and electrical current will still pass through the load during series arcing.

Series arcing occurs when a physical gap opens in a circuit conductor, causing the load current to arc through the ambient air in the gap. Gaps in the conduction path can be caused in many ways. A loose crimp that has pulled apart, a severed wire, a partially unseated connector, or a screw that has vibrated out of a bolted connection are common occurrences. If these gaps are created while power is not applied, however, in most cases no arc will form when power is applied subsequently. This is because the breakdown voltage of air is sufficiently high to prevent all but the smallest gaps from arcing, even at high altitudes. On the other hand, a gap that occurs while current is flowing in the load presents a different situation. If conductors through which current is flowing are pulled apart to create a gap, an arc will form and maintain conduction across the gap as the gap spacing increases. This phenomenon is what practitioners of electric arc welding call "pulling an arc", and is why electric arc welders can use a low voltage (20V) to arc weld.

If a series arc forms across a broken connection, the load will still be powered, and a 10,000° F. arc furnace is created within the wire harness or connector. This will result in a hazardous or catastrophic condition.

Series arcing may also occur due to a build-up of carbon deposits on wire insulation. The cumulative effects of moisture and pollutants on the surface of wire insulation can cause leakage currents to flow across the surface of wire insulation and form carbonized tracks that will that eventually burn away and result in arcing.

Series arcing is often difficult to detect since the peak current during a series arc fault does not exceed the steady-state load current and thus may not cause a conventional circuit breaker to trip. In other words, a conventional circuit breaker that trips based on sensed current may be unable to distinguish between a series arc and a normal load current. The failure to quickly detect a series arc fault will allow a fault condition to fester and may lead to substantial damage.

FIG. 1 illustrates an example of a series arc occurring in an electrical circuit. In this figure, an arc 10 occurs in series with a load 30 and therefore electrical current will still be conducted via a primary wire through the load 30. In this example, heat from the arc 10 may damage the insulation of the primary wire 20 and may even ignite other flammable materials nearby.

A common approach to series arc fault detection is based on detecting distortion in the current waveform of the arc current. For example, U.S. Pat. No. 7,746,605 titled "Arc Fault Circuit Interrupter and Method of Detecting and Interrupting a Resistive Series Arc of a Power Circuit" by Robert Elms et al. describes a method of detecting series arcing by sensing current flowing through contacts and detecting voltage zero crossings between a load terminal and a neutral conductor. A processor detects, based on a profile of sensed current near the voltage zero crossings, the existence of series arcing and if detected, operates a switch to break the circuit. This method however is limited to AC circuits and is complicated, requiring not only the sensing of current flow but also the detection of voltage zero crossings. Other techniques have been proposed that attempt to sense the presence of a series arc by looking at the frequency content of the DC current waveform or looking for random current fluctuations due to the presence of an arc. These techniques may be fooled into a false detection by high RFI fields in the environment or pulsing generated by the normal operation of the load. High inductance in the load or wiring can also suppress current variation, leading to a failure to detect the arc. A simple and more robust detection solution is desired.

Series arcing in wiring is a potentially catastrophic situation that has proven to be difficult to detect reliably with existing methods. A method is needed for the simple, quick and accurate detection of series arcing in an electrical circuit.

BRIEF SUMMARY OF THE DISCLOSURE

In order to overcome and mitigate the deficiencies noted above with conventional approaches to detecting series arcing in an electrical circuit, this disclosure presents a solution that senses and compares the voltage at each end of a conductor and declares a fault when the sensed voltage differential exceeds the minimum voltage required to sustain arcing. The apparatus and method disclosed herein provide a quick and accurate way to detect series arcing in an electrical circuit. The disclosure is applicable to both AC and DC circuits and may be used at any voltage or current level.

As used herein, the terms "trip," "break" and "interrupt" have the same meaning and refer to the discontinuation of electrical continuity or current flow in a circuit.

BRIEF DESCRIPTION OF DRAWINGS

The features and advantages of this disclosure will be more fully understood with reference to the following, more detailed description, when taken in conjunction with the accompanying figures.

DETAILED DESCRIPTION

Reference will now be made in detail to describe the exemplary embodiments of this disclosure, which are illustrated in the accompanying drawings. Specific details disclosed herein are not to be interpreted as limiting, but rather as a basis for the claims and teaching one skilled in the art how the present invention could be employed in any appropriately detailed system, structure or manner. The same reference numbers will be used throughout the drawings to refer to the same or like components, circuits or functions.

Figure 1:
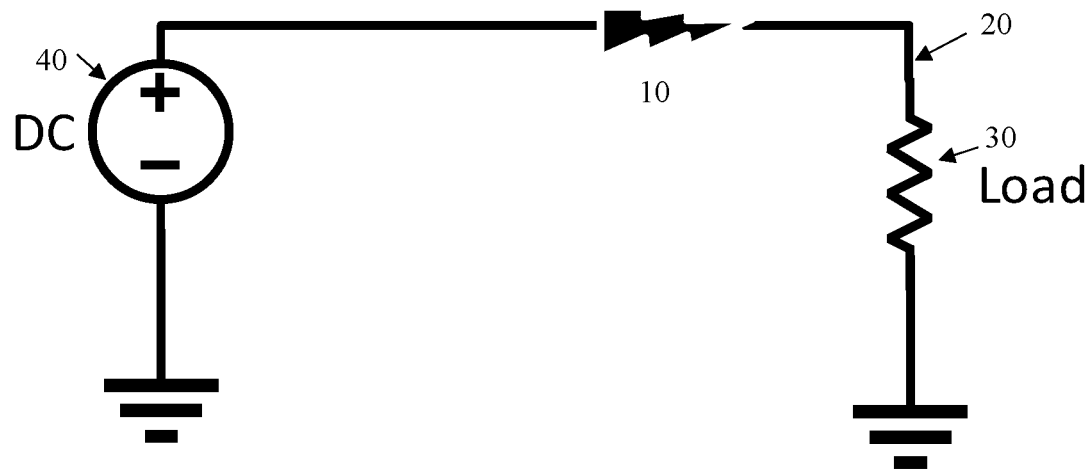
FIG. 1 illustratively depicts a series arc occurring in an electrical circuit when a gap opens in the circuit and the load current arcs across the gap.
Figure 2:
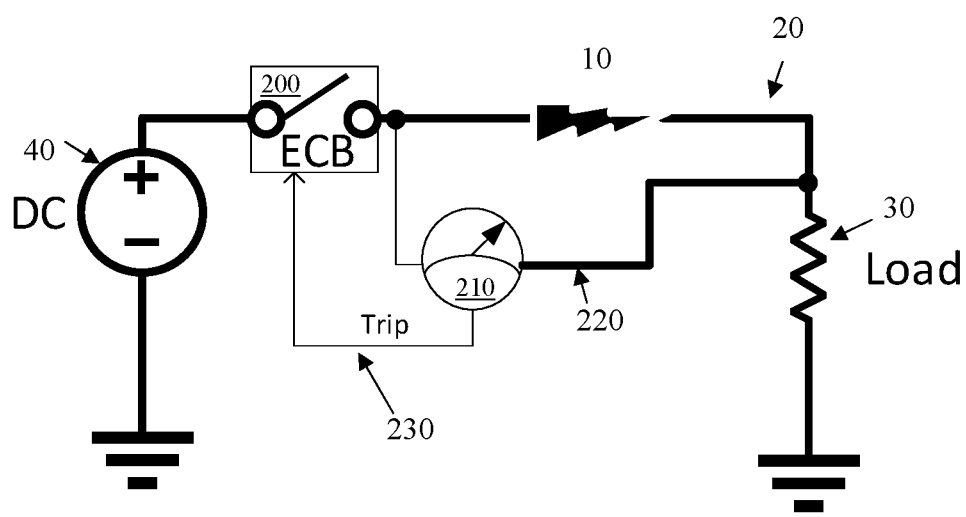
FIG. 2 is a circuit diagram of an exemplary embodiment of a series arc voltage detection circuit that uses a differential voltage sensor in accordance with the disclosure.

FIG. 2 is a circuit diagram of an exemplary embodiment of a series arc voltage detection circuit that uses a differential voltage sensor. As illustrated in FIG. 2, a circuit protective device 200 is interposed along a primary wire 20 between a load 30 and a power source 40 (assumed, in this example, to be the standard aircraft supply voltage of 270 VDC). The circuit protective device 200 has a "Line In" side and a "Line Out" side, and the "Line In" side is connected via primary wire 20 to the power source 40 and the "Line Out" side is connected via the primary wire 20 to the load 30. The protective device 200 may be of any size or of any technology that allows for an automatically commanded opening, such as an Electronic Circuit Breaker (ECB). A differential voltage sensor 210 is also provided. One side of the differential voltage sensor 210 is connected to the "Line Out" side of the circuit protective device 200 and the other side is connected to the load through a sense wire 220. In order to prevent damage to the wire under a fault condition, the sense wire must be of the same gauge as the primary wire 20, which is determined by the size of the protective device. A trip line 230 is connected from the differential voltage sensor 210 to a trip input on the protective voltage sensor 200.

An arc between conductors will have a minimum voltage across it that is determined by the composition of the conductors and the dimensions of the arc plasma. In the case of copper, the voltage necessary to free electrons from the surface (known as the work function of copper) is:

| Cu | 4.53-5.10 |
|---|---|

The electrode voltage fall is based on the work function. Since there are two surfaces, there are two electrode falls, i.e., an anode voltage fall and a cathode voltage fall, as shown in the graph of FIG. 6.

Figure 6:
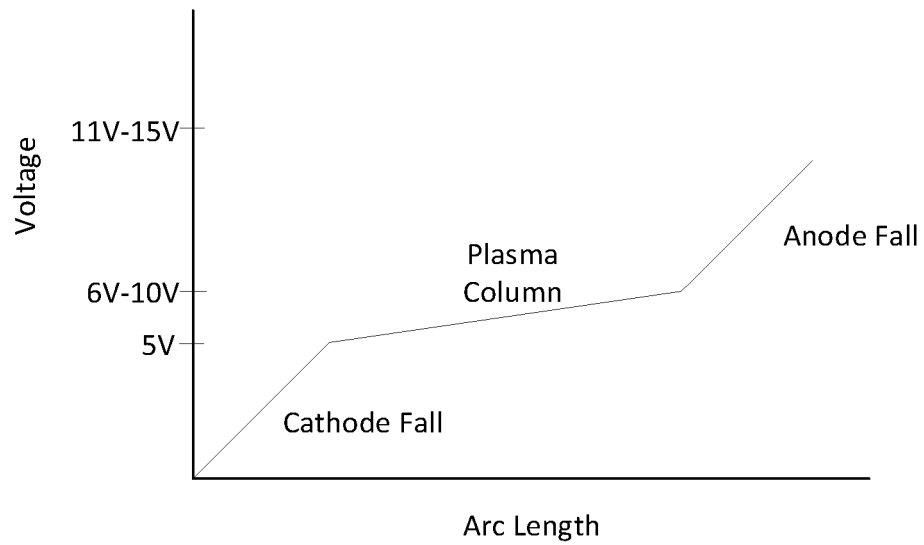
FIG. 6 is a graph showing voltage drop across an arc.

Thus, as can be seen from the graph of FIG. 6, in the case where copper is the conductor and air is the plasma-forming gas, the arc voltage will never be less than 11 V under any conditions. Aircraft certification authorities require that no more than 3% of the source voltage can appear across wires connecting sources to loads under worst case load current consumption. Therefore, a properly sized wire between the source and the load will have no more than 8 V (3% of 270 VDC) across it under any conditions, and therefore a sensed voltage difference of greater than 11 V indicates a fault in the wiring. The fault can be an arc fault, or a high resistance connection causing a greater than allowed voltage drop on the wire. Both situations are equally hazardous. When this magnitude of voltage differential is detected, the differential voltage sensor 210 will issue a signal on the trip line 230, causing the protective device 200 to trip and remove power to the defective wiring. Alternately, the protective device 200 may annunciate a possible fault at a certain level, and trip at another, higher level of differential voltage. Peak voltages above 11 V can be caused by transient and EMI conditions, so a filter and time delay (not shown) may be added to the differential voltage sensor to eliminate false trips caused by these effects. Additionally, since the actual current being conducted in the wire is a known quantity, the wiring power loss can be calculated and a trip or annunciate decision can be made based on having an unusually high power loss for a predetermined amount of time.

Figure 3:
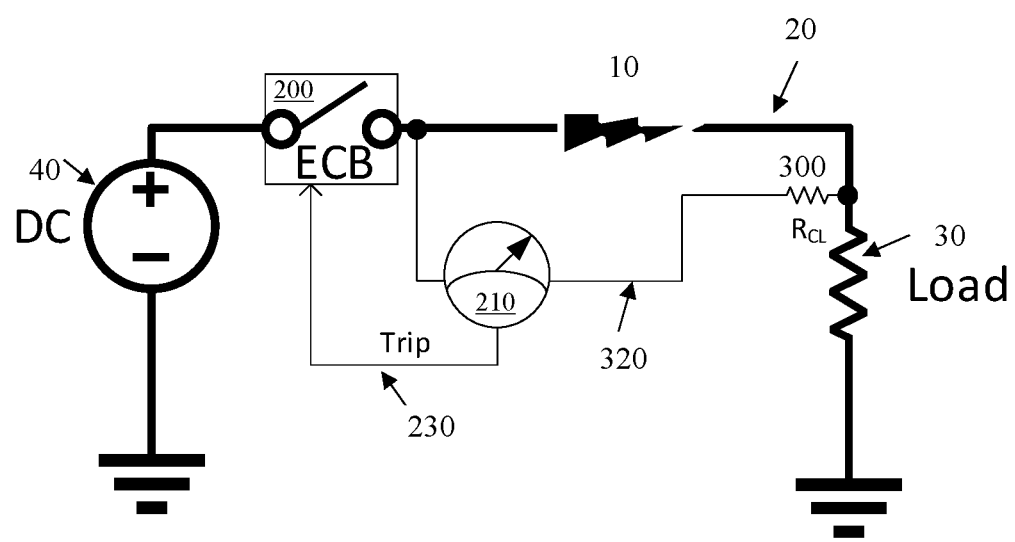
FIG. 3 is a circuit diagram of an alternate exemplary embodiment of a series arc voltage detection circuit that uses a limit resistor at the load side of the circuit in accordance with the disclosure.

FIG. 3 illustrates a circuit diagram of an alternate exemplary embodiment of the series arc voltage detection circuit. In this embodiment, a limit resistor $R_{CL}$ 300 is deployed in the sense wire 320 at the load side of the circuit. Because the limit resistor 300 limits current flow through sense wire 320, this method allows a smaller gauge of wire to be used for the sense wire than what would normally be required by the size of the protective device 200. Indeed, FIG. 3 shows the sense wire 320 as having a smaller gauge than sense wire 220 of FIG. 2. A smaller wire size reduces the weight and cost of the sense wires.

Figure 4A:
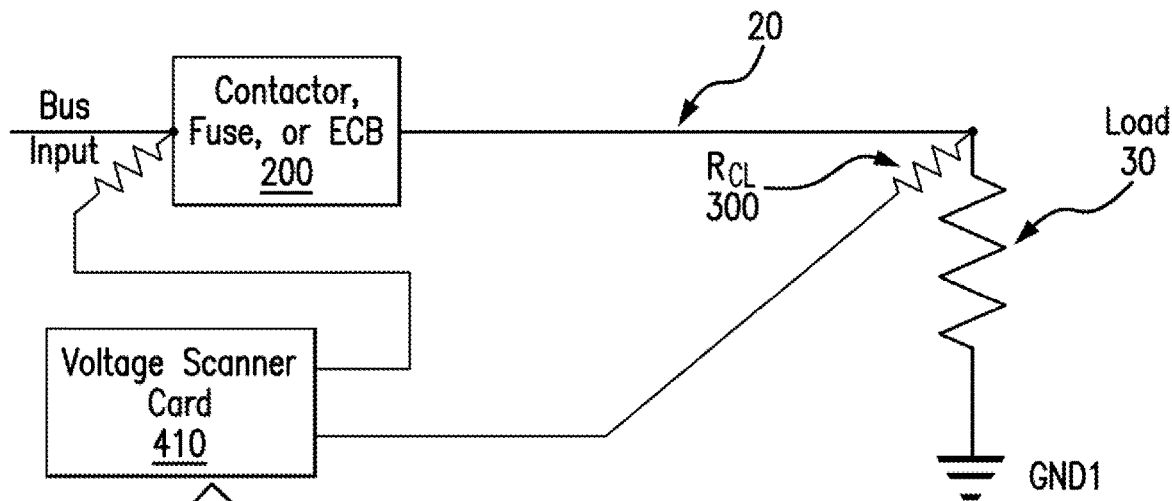
FIG. 4A is a circuit diagram of an exemplary embodiment of the series arc voltage detection circuit of FIG. 3 wherein a voltage scanner card is used as a differential voltage sensor in accordance with the disclosure.
Figure 4B:
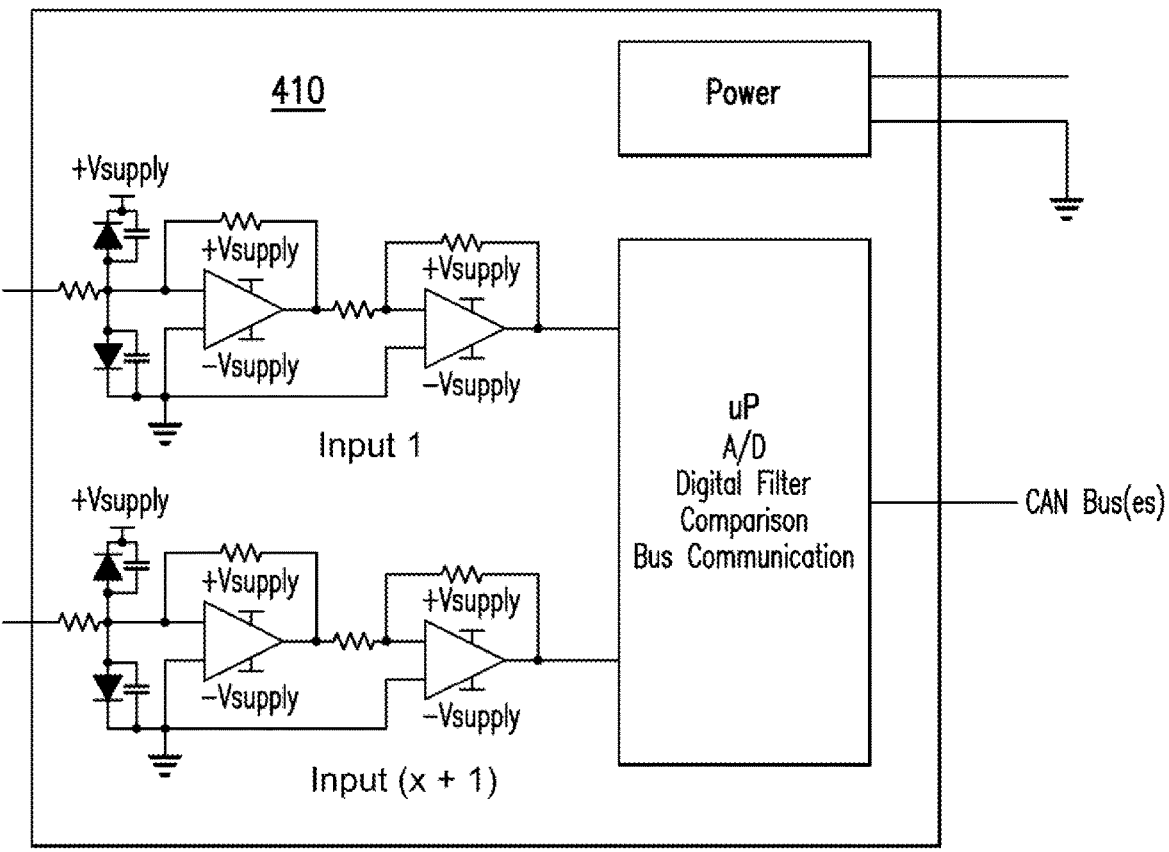
FIG. 4B illustrates an exemplary embodiment of a circuit diagram of the voltage scanner card of FIG. 4B.

FIG. 4A illustrates an exemplary embodiment of the series arc voltage detection circuit of FIG. 3 wherein a voltage scanner card 410 is used as the differential voltage sensor. FIG. 4B shows, in greater detail, an exemplary embodiment of a circuit diagram of the voltage scanner card 410.

Figure 5:
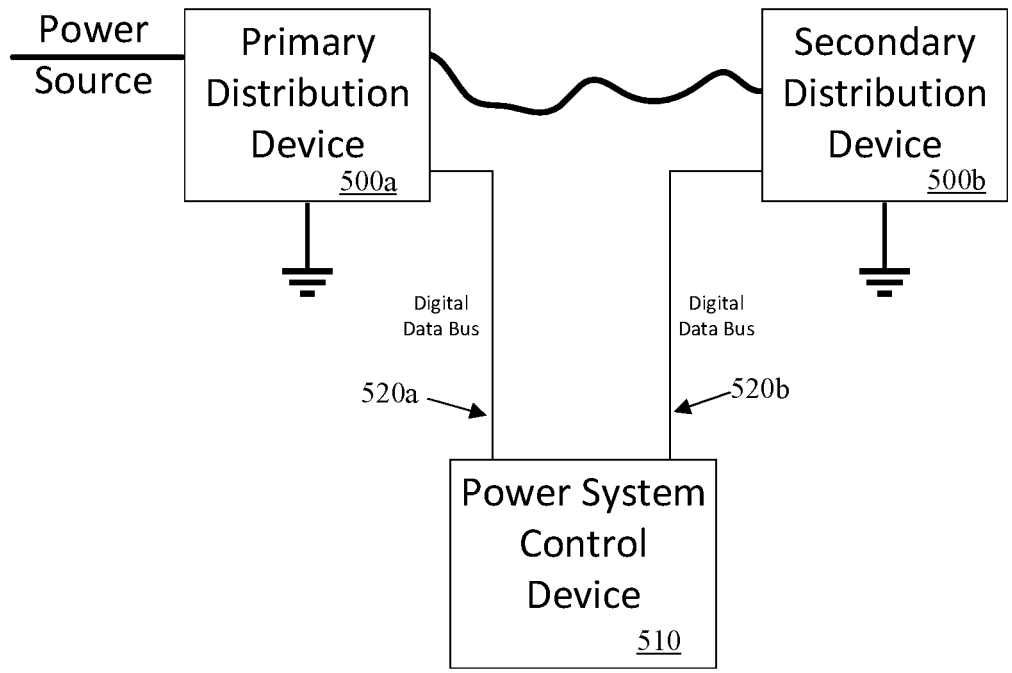
FIG. 5 is a circuit diagram of another exemplary embodiment of the series arc voltage detection circuit in accordance with the disclosure.

An additional alternative method is available when the Power Distribution System is comprised of components that have the ability to measure and transmit input and output voltages to a Power System Control Device 510. See FIG. 5 for a circuit diagram illustrating an embodiment of this method. In this case, a Primary Distribution Device 500a measures and sends the voltage at its output terminal(s) over a digital data bus 520a to a Power System Control Device 510. A secondary Distribution Device 500b also measures and sends the voltage at its input terminal over a digital data bus 520b to the Power System Control Device 510. The Power System Control Device 510 then compares the transmitted voltage value from the Primary Distribution Device 500a with the transmitted voltage value from the Secondary Distribution Device 500b. As in the other embodiments of this invention, a voltage differential of greater than 11V indicates a fault in the interconnecting wire. This embodiment eliminates the need for any additional hardware to implement the fault detection scheme, as voltage measurements are commonly performed by the power system components, and need only to be compared by the Power System Control Device 510 to detect the fault.

The method disclosed above allows for the quick and accurate detection of series arcing in an electrical circuit. This method works with either AC or DC power sources, and at any voltage or current level. This method will also detect high resistance in a circuit, which is an indicator of a potentially hazardous fault condition.

While specific embodiments of the disclosed subject matter have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the claims appended and any and all equivalents thereof.

What is claimed is:

1. A series arc detection apparatus comprising:
    a power source terminal;
    a circuit load terminal;
    a protective device having a Line In side, a Line Out side, and a trip signal input, wherein the Line In side is connected to the power source terminal and the protective device is configured to interrupt an electrical connection between the Line In and Line Out sides when a trip signal is received at the trip signal input;
    a wire conductor having a first end and a second end, wherein the first end is connected to the Line Out side of the protective device and the second end is connected to the circuit load terminal; and
    a differential voltage sensor connected on a first end via a sense wire to the circuit load terminal and connected on a second end to the Line Out side of the protective device, the differential voltage sensor additionally connected via a trip wire to the trip signal input of the protective circuit.

2. The series arc detection apparatus of claim 1, wherein the differential voltage sensor senses and compares voltage levels at the load terminal and the Line Out side of the protective device and, if the sensed differential voltage exceeds a predetermined minimum value, outputs a trip signal via the trip wire, and upon receipt thereof the protective device interrupts the electrical connection between its Line In and Line Out sides.

3. The series arc detection apparatus of claim 1, wherein the protective device is an electronic circuit breaker.

4. The series arc detection apparatus of claim 1, wherein the differential voltage sensor outputs a trip signal on the trip wire whenever a differential voltage of greater than 15 V is sensed.

5. The series arc detection apparatus of claim 1, wherein the protective device comprises a speaker or beeper.

6. The series arc detection apparatus of claim 5, wherein the speaker or beeper of the protective device is configured to annunciate a warning at a first predetermined level of differential voltage and the protective device is configured to trip at a second predetermined level of differential voltage.

7. The series arc detection apparatus of claim 1, wherein the differential voltage sensor further comprises a filter and a time delay that are configured to prevent false trips caused by transient and EMI conditions.

8. The series arc detection apparatus of claim 1, wherein the power source terminal is connected to an aircraft power source.

9. A method of detecting series arcing in an electric circuit having a power source terminal, a circuit load terminal, a protective device having a line in side connected to the power source terminal, and a line out side connected to the circuit load terminal, comprising the steps of:
    sensing a differential voltage level between the circuit load terminal and the line out side of the protective device;
    declaring an arc fault when the sensed differential voltage levels exceeds a predetermined minimum voltage required to sustain arcing by activating the protective device; and
    annunciating a warning at a first predetermined level of differential voltage and declaring the arc fault at a second predetermined level of differential voltage.

\* \* \* \* \*